(12) United States Patent
Honea

(10) Patent No.: US 6,305,300 B1
(45) Date of Patent: Oct. 23, 2001

(54) ADJUSTABLE TABLE SYSTEM

(76) Inventor: Richard P. Honea, 251 Rainbow Dr., Livingston, TX (US) 77399-2051

( * ) Notice: Subject to any disclaimer, the term of this patent is extended or adjusted under 35 U.S.C. 154(b) by 0 days.

(21) Appl. No.: 09/665,562

(22) Filed: Sep. 18, 2000

(51) Int. Cl.[7] .................................................. A47B 23/00
(52) U.S. Cl. ................................................. 108/44; 108/1
(58) Field of Search .................................. 108/44, 43, 1, 108/5; 224/276

(56) References Cited

U.S. PATENT DOCUMENTS

| | | | |
|---|---|---|---|
| 2,487,536 | 11/1949 | Fiscus . | |
| 2,746,821 | * 5/1956 | Schroeder | 108/44 |
| 2,749,655 | * 6/1956 | Ashton | 108/44 X |
| 2,866,381 | 12/1958 | Alldredge . | |
| 3,026,159 | * 3/1962 | Miller et al. | 108/1 |
| 4,166,559 | * 9/1979 | Richardson | 108/44 X |
| 4,453,788 | * 6/1984 | Russell | 108/44 X |
| 4,749,161 | 6/1988 | Falcone . | |
| 4,890,559 | 1/1990 | Martin . | |
| 6,036,158 | 3/2000 | Raasch . | |
| 6,038,983 | 3/2000 | Lendl . | |
| 6,155,469 | * 12/2000 | Johnson et al. | 108/44 X |

* cited by examiner

Primary Examiner—Jose V. Chen
(74) Attorney, Agent, or Firm—Michael R. Schacht; Hughes & Schacht, PLLC

(57) ABSTRACT

An adjustable table system comprising first and second offset members, an attachment system, a support assembly, and a work surface assembly. The offset members each comprise offset edges defining a offset planes, engaging surfaces defining reference planes, and spacing walls extending between the offset edges and the engaging surfaces. The spacing walls are sized and dimensioned to create offset angles between the offset planes. The attachment system attaches the offset members together such that the offset members are rotatable relative to each other about an offset axis. The support assembly engages one of the offset members to support the offset member at a desired location. The work surface assembly engages the other offset edge to form a work surface at the desired location. Rotation of the offset members relative to each other about the offset axis alters an angle between the offset planes and thus an angle of the work surface with respect to horizontal.

27 Claims, 5 Drawing Sheets

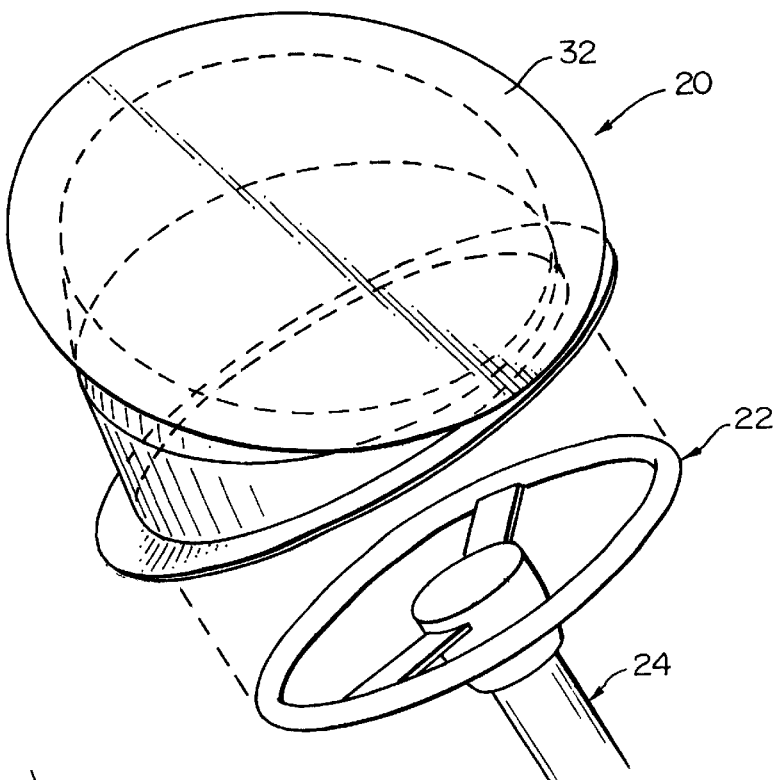
FIG. 1
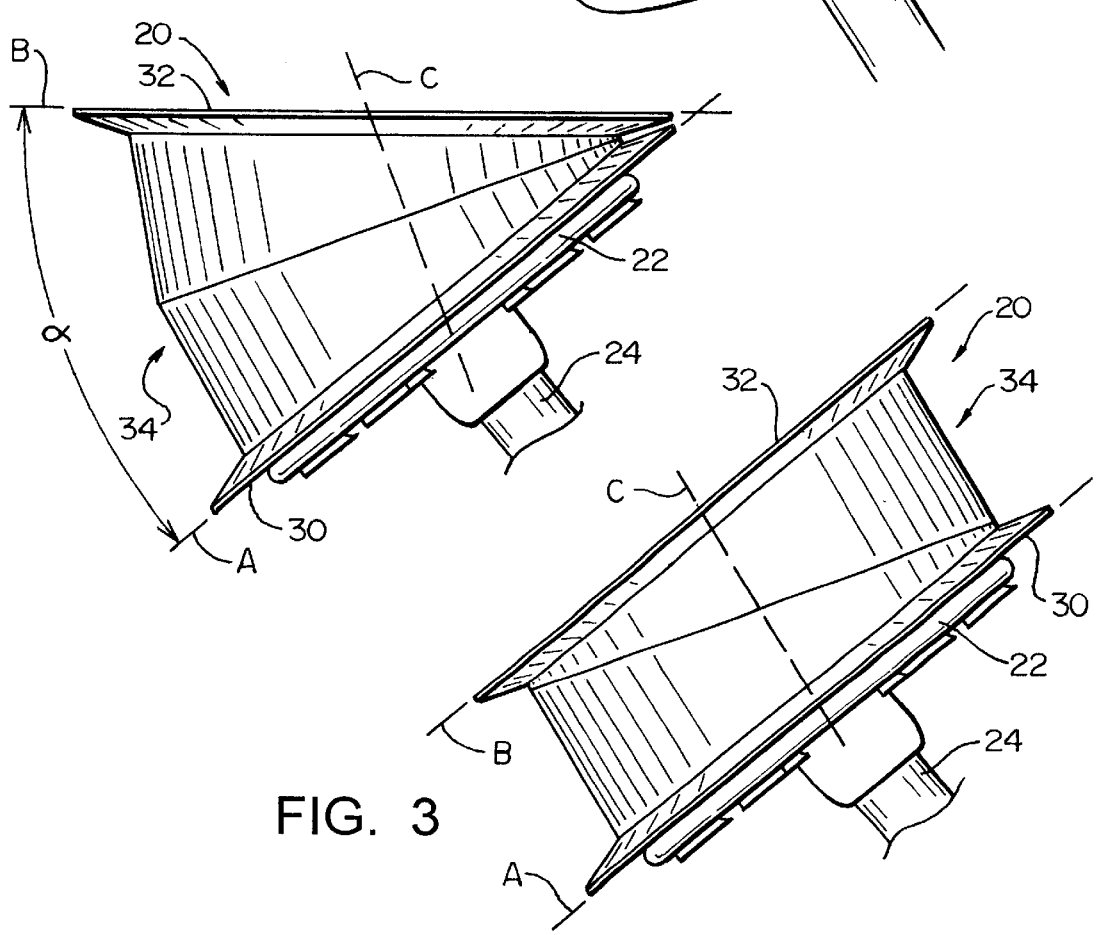
FIG. 2
FIG. 3

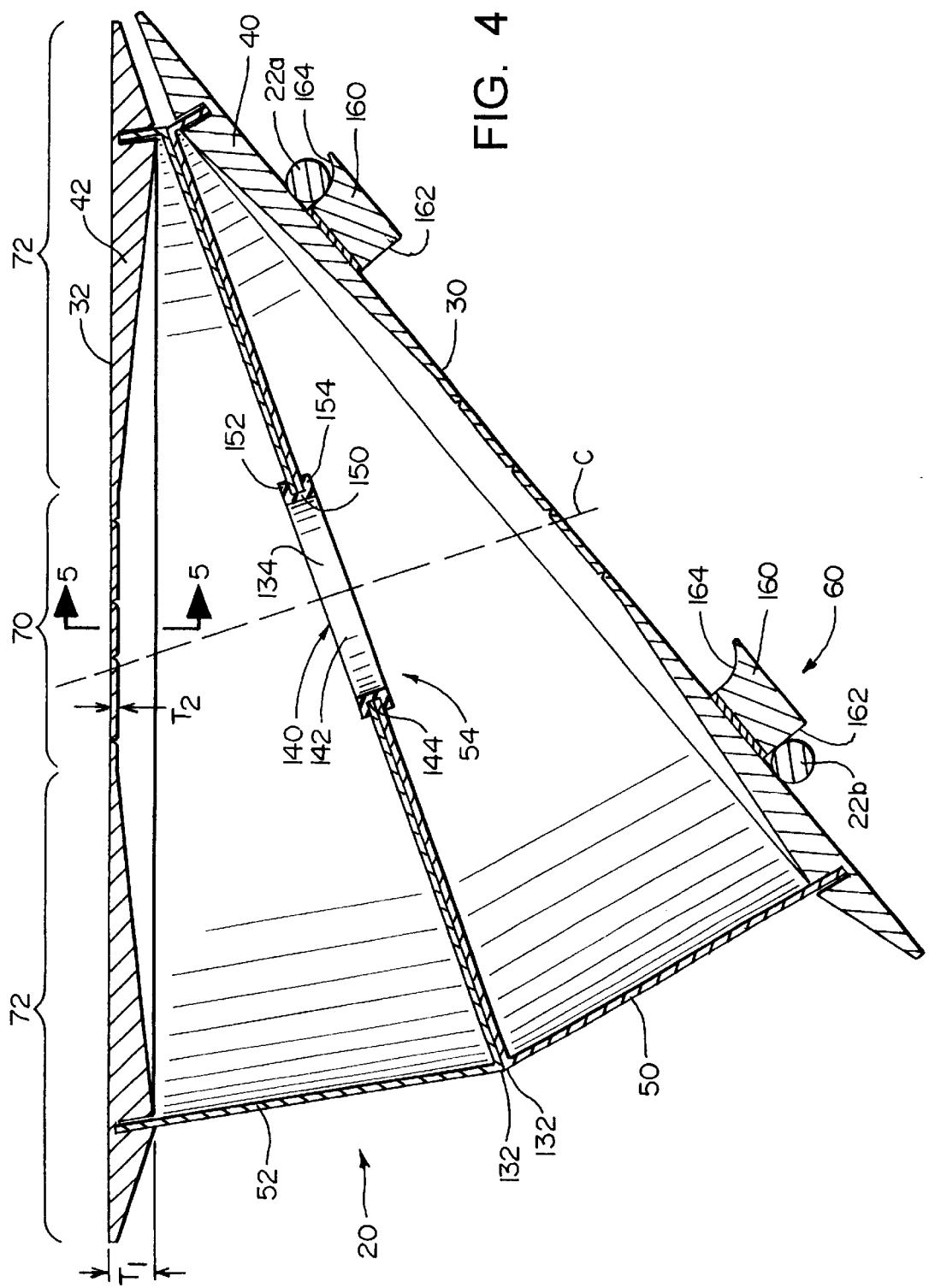

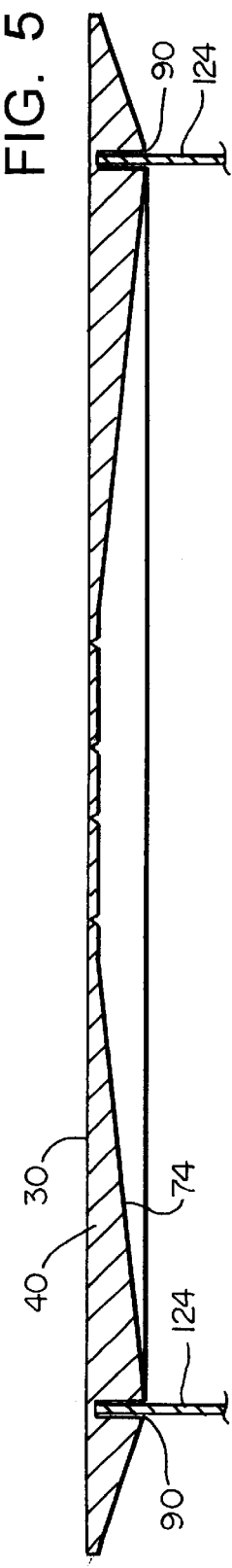
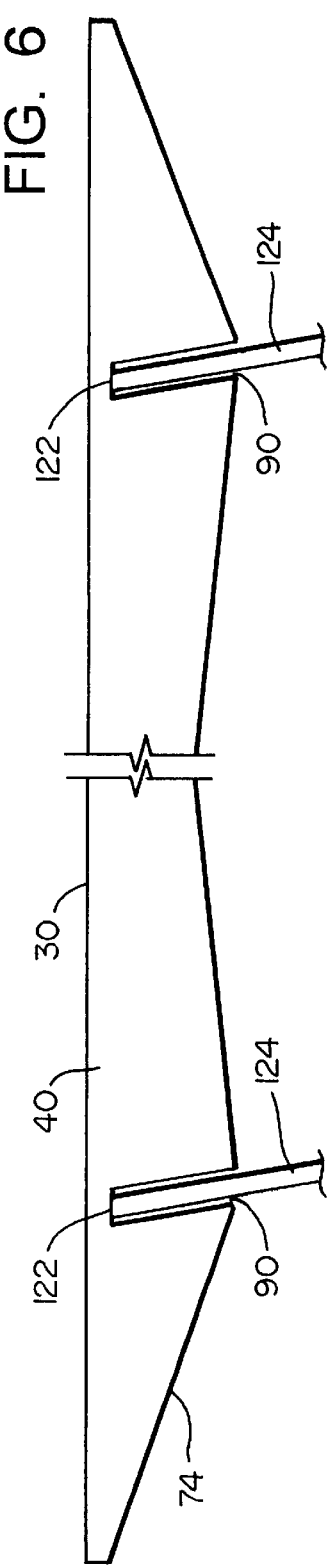
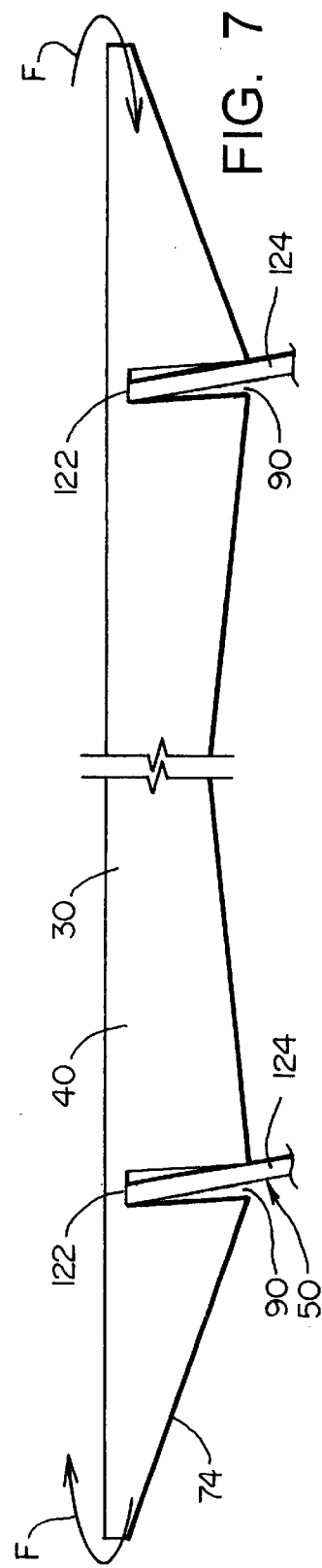

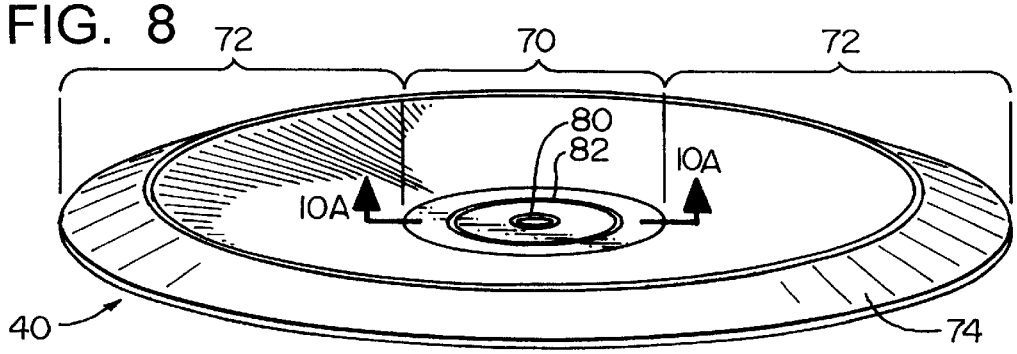
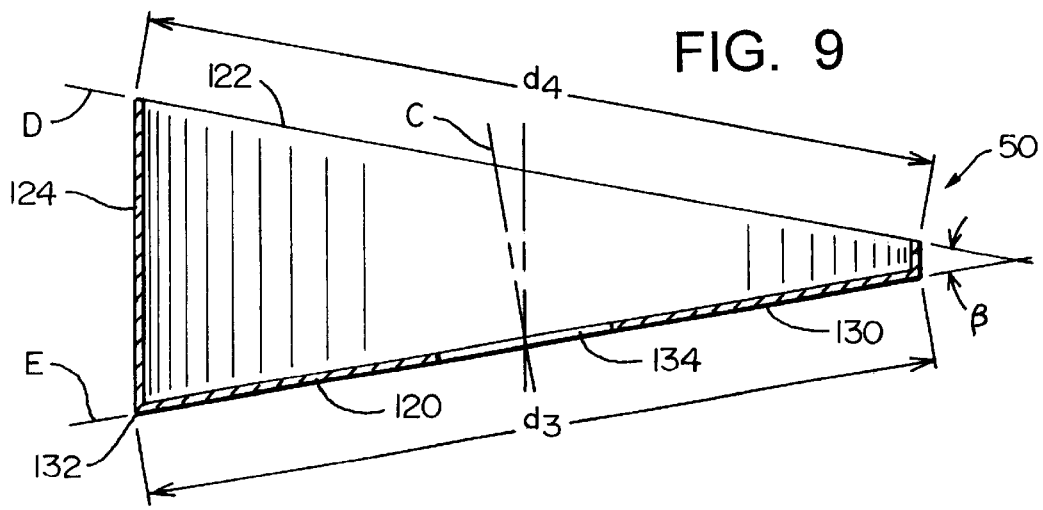
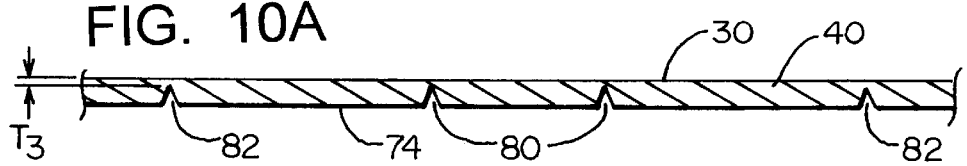
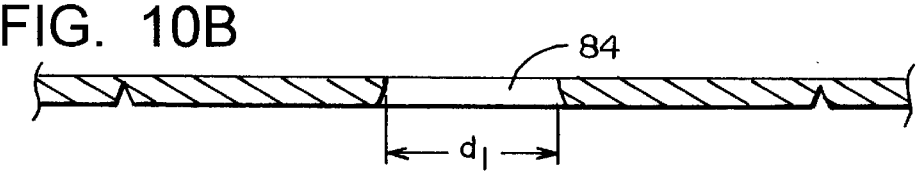
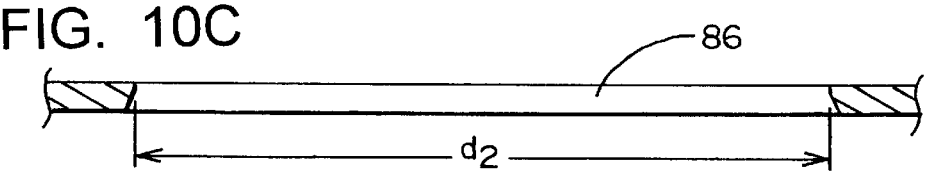

ADJUSTABLE TABLE SYSTEM

FIELD OF THE INVENTION

The present invention relates to systems and methods for forming work or support surfaces and, more specifically, to such systems and methods that allow an angle of the work surface to be adjusted.

BACKGROUND OF THE INVENTION

In many situations, the need exists for a table or other structure for creating a support surface at a desired height and orientation. For example, a table that forms a writing surface should be at a height between the waist and the chest and should be substantially horizontal. However, it may be desirable for a stand for a computer monitor to form a support surface that is angle with respect to horizontal.

In many situations, then, tables are made adjustable to allow an angle of a work surface to be adjusted in relation to a reference surface. For example, a draftsman's table comprises a leg structure that defines a reference plane and a work surface that is adjustable relative to the reference plane.

The present invention relates to table structures that allow adjustment of a working surface relative to a reference plane. The present invention has particular significance in the context of forming a work surface over a steering wheel, and that application will be described in detail herein. However, the present invention has broader application to other environments requiring an adjustable table system. Accordingly, the scope of the present invention is defined by the claims appended hereto rather than the following detailed description.

In motor coaches, space is at a premium. In addition, the driver and passenger seats of motor coaches are designed for prolonged sitting and thus are very comfortable. Accordingly, it is common to use the cab of a motor coach as an "office" when the motor coach is parked.

Commonly, a temporary work surface is provided for use with the seating surfaces formed by the driver and passenger seats. This temporary work surface is formed by a rigid member or panel that defines the work surface and is attached, using a variety of means, to the steering wheel of the motor coach. Such temporary work surfaces provide a stable, flat surface that is supported at generally the right height to form a desk or writing surface. Because the steering wheel is often not completely horizontal, the rigid panel is often pivotably connected at one end to the steering wheel, and braces are provided to lift the other end such that the working surface is substantially horizontal.

The prior art temporary work surfaces of which the Applicant is aware are generally complex, relatively expensive mechanical devices that are dedicated solely for use as a temporary work surface supported by a steering wheel.

The need thus exists for improved, cost effective systems and methods of forming an adjustable work surface that may be used, as one example, for form a desk surface in the cab of a motor coach.

PRIOR ART

The following patents were uncovered as part of a professional patentability search conducted on behalf of the Applicant.

U.S. Pat. No. 6,038,983 to LendI discloses a steering column table having a lower part that is attached to a vehicle steering wheel and an lid pivotably connected to the lower part. A support device is pivotably connected to the lid between the lid and the lower part. The lid is rotated through a desired angle until it is generally level, and then the support device is rotated down until it engages a slot in the lower part. With the support device engaged in the slot, the lid is held fairly close to the desired angle.

U.S. Pat. No. 6,036,158 to Raasch discloses a steering wheel mounted tray defining a slot through which a portion of a steering wheel extends. The slot is shorter than the diameter of the steering wheel, so the steering wheel engages and supports the tray. The angle of the tray relative to the steering wheel does not appear to be adjustable, and this device would not work if the steering wheel is substantially horizontal.

U.S. Pat. No. 4,890,559 to Martin discloses a device similar to the LendI device in which a base is attached to the steering wheel column. A top panel is rotatably attached to the base. Leg members arranged on either side of the base member are rotatably attached to the top panel. The leg members are fixed to the base when the top panel is at a desired angle.

U.S. Pat. No. 4,749,161 to Falcone discloses a steering wheel table that folds flat when stored. During use, two main panels fold out and hook onto the steering wheel to form a table surface slanted at the same angle as the steering wheel. Two side panels fold out from one of the main panels to create a small generally horizontal surface. The angles of the main panels and side panel are not adjustable relative to the steering wheel.

U.S. Pat. No. 2,866,381 to Alldredge discloses a stereographic map reading apparatus that has a table for supporting the map. The table engages a steering wheel to form a pivoting connection; a brace extends from the edge of the table distal from the steering wheel to support the table in a generally horizontal position.

U.S. Pat. No. 2,749,655 to Ashton discloses a portable desk designed to be attached to a steering wheel. The Ashton device folds for storage. When opened, hooks are exposed which engage the steering wheel. This device does not appear to be adjustable.

U.S. Pat. No. 2,487,536 to Fiscus discloses a desk attachment for a steering wheel comprising a flat member and two bracket members. The bracket members have a hook on an upper end and are triangular such that the bracket members space the lower end of the flat member from the steering wheel. The bracket members make the angle of the flat member closer to horizontal, but the flat member is far from horizontal, and the angle is not adjustable.

All of the devices disclosed in these patents are relatively complex, expensive devices, and none of these devices are, practically speaking, continuously adjustable.

SUMMARY OF THE INVENTION

An adjustable table system comprising first and second offset members, an attachment system, a support assembly, and a work surface assembly. The offset members each comprise offset edges defining a offset planes, engaging surfaces defining reference planes, and spacing walls extending between the offset edges and the engaging surfaces. The spacing walls are sized and dimensioned to create offset angles between the offset planes. The attachment system attaches the offset members together such that the offset members are rotatable relative to each other about an offset axis. The support assembly engages one of the offset members to support the offset member at a desired location.

The work surface assembly engages the other offset edge to form a work surface at the desired location. Rotation of the offset members relative to each other about the offset axis alters an angle between the offset planes and thus an angle of the work surface with respect to horizontal.

DESCRIPTION OF THE DRAWING

FIG. 1 is view depicting a table assembly of the present invention;

FIG. 2 is view of the table and its angle adjusting system;

FIG. 3 is a side elevation view of the table showing a different angle of adjustment;

FIG. 4 is a section view of the table assembly of FIG. 1;

FIG. 5 is a section view of the table assembly of FIG. 1 taken along lines 5—5 in FIG. 4;

FIG. 6 is a view of the mounting groove of the table assembly;

FIG. 7 is another view of the mounting groove of the table assembly;

FIG. 8 is a view of the table member;

FIG. 9 is a view of the first offset member;

FIGS. 10A, 10B, 10C, are views showing the grooves of the table member; and

DETAILED DESCRIPTION OF THE PREFERRED EMBODIMENTS

Figure 11:
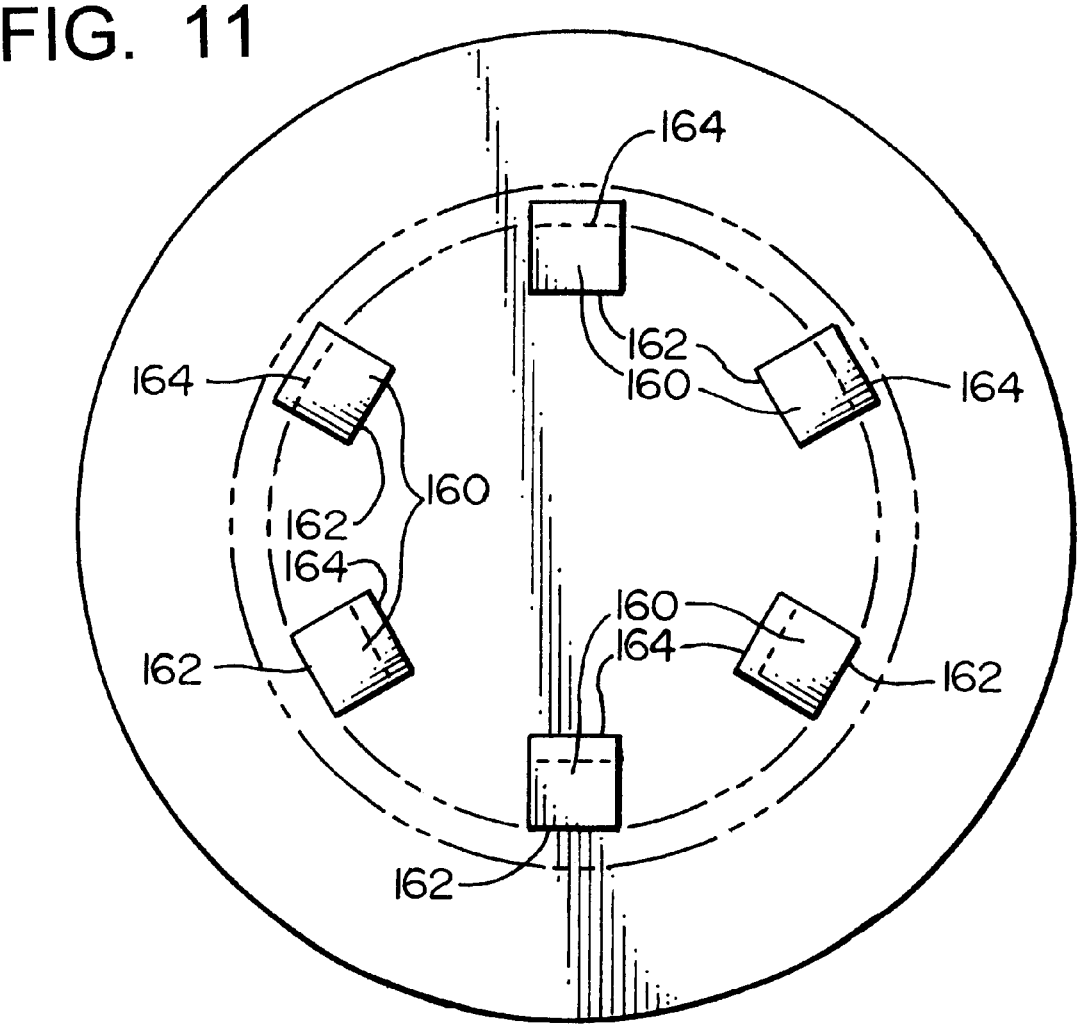
FIG. 11 is view showing the mounting system of the table assembly.

Referring now to the drawing, depicted at 20 therein is a table system constructed in accordance with, and embodying, the principles of the present invention. The exemplary table system 20 is adapted to be mounted on to a steering wheel 22 supported by a steering column 24. The table system 20 is particularly suited for use with a steering wheel as described herein, but the present invention may, as will be described in further detail below, have application to other environments. The scope of the present invention should thus be determined by the claims appended hereto and not the following detailed description.

The exemplary table system 20 comprises a reference surface 30 and a working surface 32. The reference surface 30 engages the steering wheel 22. The working surface 32 forms a platform on which books, papers, computers, and the like may be supported while working.

The table system 20 further comprises an angle adjusting system 34 that, as shown by a comparison of FIGS. 1 and 2, allows a table angle a between planes A and B defined by the reference and working surfaces 30 and 32 to be adjusted.

With the foregoing general understanding of the present invention in mind, the details of the exemplary table system 20 will now be described. As perhaps best shown in FIG. 4, the reference surface 30 is defined by a first table member 40, while the working surface 32 is defined by a second table member 42.

The exemplary angle adjusting system 34 comprises a first offset member 50, a second offset member 52, and axle means 54. The axle means 54 connects the first and second offset members 50 and 52 together such that the offset members 50 and 52 rotate relative to each other about an offset axis C depicted in FIGS. 2–4. FIG. 4 also depicts a mounting system 60 used to attach the exemplary system 20 to the steering wheel 22.

In the exemplary table system 20, the first table member 40 is identical to the second table member 42 and the first offset member 50 is identical to the second offset member 52. It is not necessary that these members 40, 42, and 50, 52 be identical to each other, but doing so decreases manufacturing costs and results in aesthetically pleasing design.

In addition, in some forms of the present invention, the table members may be integrally formed with its associated offset member. If the table system 20 is to be manufactured using conventional injection molding techniques, the table members are preferably manufactured separate from the offset members and joined during use. However, if other manufacturing techniques are used, such as rotational molding, it may be cost effective to integrally form the table members with the offset members.

Because the exemplary table members 40, 42 are identical and the exemplary offset members 50 and 52 are identical, only the first table member 40 and the first offset member 50 will be described in detail herein with an understanding that this description applies to the second table member 42 and the second offset member 52.

Referring again to FIG. 4, the first table member comprises a central portion 70 and a perimeter portion 72. A maximum thickness T1 of the perimeter portion 72 is substantially greater than a minimum thickness T2 of the central portion 70. For some materials and manufacturing techniques, such as milled wood, the thickened central portion 70 will be a solid thickened layer extending in an annular ring around the table member 40. With other materials and manufacturing techniques, such as injection molded plastic, the thickened portion T1 would preferably be made by discreet flanges radially extending from the central portion 70.

Referring now to FIG. 8, it can be seen that the exemplary table member 40 is thickened around its entire perimeter portion 72. The table member 40 thus defines an inner surface 74 that is not planar. In contrast, the reference surface 30 defined by the table member 40 is substantially planar so that it may be used as a writing or desk surface as desired.

FIG. 8 also shows that inner and outer annular grooves 80 and 82 are formed on the inner surface 74. These grooves are depicted in more detail in the enlarged drawing of FIG. 10A. The purpose of these grooves 80 and 82 is to allow a hole to be formed in the table member if desired. In particular, FIG. 10A shows that these grooves 80 and 82 create a substantially reduced thickness T3 in the central portion 70 of the table member 40. The material from which the table member 40 is manufactured is strong enough to bear the loads of normal use as a writing table or desk without breaking at the reduced thickness portions defined by the grooves 80 and 82. However, if a hole if desired in the table member 40, a disc or ring may be punched out of the central portion 70 to form such a hole.

In particular, as shown in FIG. 10B, punching or scoring the table member 40 along the inner groove 80 can establish a first hole 84 having a diameter of approximately D1 in the table member 40. And as shown in FIG. 10C, punching or scoring along the outer groove 82 establishes a hole having a diameter of approximately D2. As shown, the diameter D2 of the second hole 86 will be greater than the diameter D1 of the first hole 84.

The holes 84 or 86 are concentric with each other and with the overall dimensions of the table member 40 in the exemplary table system 20. However, grooves may be formed at other locations in the table member 40 to allow the user to form one or more holes at different locations as desired.

The purpose of these holes is to allow the user to extend power cords, computer cables, and the like through the table system 20. This would allow the user to maintain a more organized workspace on the working surface 32 formed by the table system 20.

Referring now to FIGS. 5–6, it can be seen that a mounting groove 90 is formed in the inner surface 74 of the exemplary table member 40. The exemplary mounting groove 90 is a continuous groove that extends around the entire perimeter portion 72, but a similar affect may be obtained by forming discrete grooves or relief cuts in each of a plurality of flanges formed on the underside of a table member of a different configuration. The purpose of the mounting groove 90 is to allow the table member 40 to be detachably attached to the first offset member 50, as will be described in further detail below.

As briefly described above, the first and second offset members are identical, so only the first offset member 50 will be described herein in detail. As shown in FIG. 9, the first offset member 50 comprises an engaging wall 120, an offset edge 122, and a spacing wall 124. The engaging wall 120 defines an engaging surface 130 that, in the exemplary table system 20, is substantially planar. The offset edge 122 defines an offset plane D that extends at an angle β with respect to an engaging plane E defined by the engaging surface 130.

The spacing wall 124 extends from the offset edge 122 to a perimeter edge 132 defined by the engaging wall 120.

In the exemplary offset member 50, the engaging wall 120 and thus the perimeter edge 132 thereof, is circular and has a diameter D3. The exemplary offset edge 122 is also circular and has a diameter D4.

The spacing wall 124 is defined by the shortest lines extending between the offset edge 122 and the perimeter edge 132. Because these edges 122 and 132 are circular, the exemplary spacing wall 124 is not a true cylinder. The geometry of the spacing wall 124 is not critical to any given implementation of the present invention.

FIG. 9 also shows that an attachment hole 134 is formed in the engaging wall 120. The attachment hole defines the offset access C described above. As will be described in further detail below, the attachment hole 134 forms part of the axle means 54 described above.

The exemplary angle adjusting system 34 is formed by arranging the first and second offset members 50 and 52 such that their respective engaging surfaces 130 are in contact and the perimeter edges 132 are aligned. The attachment holes 134 of the offset members 50 and 52 will also be aligned. As the first and second offset members 50 and 52 rotate relative to each other while maintaining alignment of the perimeter edges 132, the angle between the offset planes D will change.

In practice, the reference plane A is substantially parallel to one of the offset planes D, while the working plane B is substantially parallel to the other of the offset planes D. Accordingly, the angle between the offset planes D when the angle adjusting system 34 is assembled will equal the table angle a between the reference and working planes A and B. In this respect, it should be noted that the maximum of the table angle α between the reference and working planes A and B will be equal to twice the angle β, between the offset plane D and engaging plane E. The table angle α can also be decreased to zero in some configurations.

Referring again back to FIG. 4, the axle means 54 will now be described in further detail. In addition to the attachment holes 134 described above, the axle means 54 comprises an axle member 140. The exemplary axle member 140 is an annular piece defining a through hole 142 and an annular groove 144. The annular groove 144 is defined by an interior wall 150 and first and second opposing walls 152 and 154. Because the groove 144 is annular, the interior wall 150 is in the shape of a ring, and its diameter is slightly less than that of the attachment hole 134. In addition, the distance between the opposing walls 152 and 154 is just slightly greater than twice the thickness of the engaging walls 120.

In use, the axle member 140 is arranged such that the portions of the engaging walls 120 adjacent to the attachment holes 134 are received in the attachment groove 144. This allows the offset members 50 and 52 to rotate relative to each other but maintains the alignment of the perimeter edges 132.

The axle means 54 may be formed by other physical structures. For example, a flange or ridge may be integrally formed with and extend from the offset members and through the associated attachment hole of the other offset member.

Referring now to FIGS. 6 and 7, the method of attaching the first and second table members 40 and 42 to the first and second offset members 50 and 52 will now be described in further detail. As shown in FIGS. 6 and 7, the offset edge 122 is received in the mounting groove 90. In addition, the grooves 90 are slightly out of round so that rotation as shown by arrow F in FIG. 7 of the first table member 40 relative to the first offset member 50 causes the mounting grooves 90 to bind against the spacing walls 124 to form a friction fit that prevents removal of the table member 40 from the offset member 50. The table member 40 may be detached from the offset member 50 by simply rotating the table member in a direction opposite the direction shown by arrow F until the mounting grooves 90 align with the spacing walls 120 as shown in FIG. 6.

Referring now to FIGS. 4 and 11, the mounting system 60 will now be described in further detail. The mounting system 60 comprises a plurality of mounting blocks 160 that are attached to the reference surface 30 of the first table member 40. The exemplary mounting blocks 160 comprise a straight side 162 and a contoured side 164. At least two of these mounting blocks 160 are affixed to the reference surface 30 such that a distance between the straight side 162 of one of the blocks and the contoured side 164 of an opposing block is approximately the same as the diameter of the steering wheel 22.

In addition, during use, one of the mounting blocks 160 will engage an upper portion 22a of the steering wheel 22 and another of the blocks 160 will engage a lower portion 22b of the steering wheel 22. The lowermost block 160 is arranged with its contoured side 164 facing the central portion 70 of the table member 40, while the uppermost of these blocks 160 will be arranged with its contoured surface 164 facing away from the central portion 70. The contoured side 164 of the uppermost mounting block 160 engages the steering wheel upper portion 22a, while the straight side 162 of the lowermost block 160 engages the wheel lower portion 22b.

This arrangement of mounting blocks 160 allows the contoured surface 164 to be extended partly around a portion of the steering wheel 22, at which point the table system 20 is rotated such that the straight side 162 of the lowermost block engages and rests on a lower portion of the steering wheel 22.

Accordingly, downward loads on the table assembly are transferred to the steering wheel 22 through the first table member 40 and the lowermost mounting block 160. The contoured side 164 of the uppermost block 160 will prevent the table system 20 from rotating out of the steering wheel 22 about an axis defined by the lower portion of the steering wheel 22.

During normal use, the mounting blocks 160 will stably connect the table system 20 to the steering wheel 22. However, the table system 22 may be easily removed from the steering wheel 22 simply by lifting the table system 20 such that it pivots about the upper portion 22a of the steering wheel 22 until the straight surface 162 of the lowermost block 160 disengages from the lower portion 22b of the steering wheel 22. FIG. 11 illustrates that, although at least two mounting blocks 160 are used by the mounting system 60, this system 60 is optimized when more than two blocks 160 are used.

In the exemplary mounting system 60, six identical mounting blocks 160 are used. In addition, as indicated by the broken lines illustrating the contoured sides 164, the contoured sides 164 of the lowermost blocks 160 face radially inwardly while the contoured sides 164 of the uppermost blocks face radially outwardly.

From the foregoing, it should be apparent that the present invention may be embodied in many different combinations and sub-combinations of the elements and steps described above. For example, the exemplary offset edges 122 and perimeter edges 132 are both circular and have the same diameter. These offset and perimeter edges need not be completely circular and need not have the same diameter in a less optimized implementation of the present invention.

The scope of the present invention should thus be determined by the following claims and not the foregoing detailed description.

I claim:

1. An adjustable table system comprising:
    a first offset member comprising a first offset edge defining a first offset plane, a first engaging surface defining a first reference plane, and a first spacing wall extending between the first offset edge and the first engaging surface, where the first spacing wall is sized and dimensioned to create a first offset angle between the first offset plane and the first reference plane;
    a second offset member comprising a second offset edge defining a second offset plane, a second engaging surface defining a second reference plane, and a second spacing wall extending between the second offset edge and the second engaging surface, where the second spacing wall is sized and dimensioned to create a second offset angle between the second offset plane and the second reference plane;
    an attachment system for attaching the first and second offset members together such that the first engaging surface is in contact with the second engaging surface and the offset members are rotatable relative to each other about an offset axis;
    a support assembly for engaging the first offset member and supporting the first offset member at a desired location;
    a work surface assembly for engaging the second offset edge to form a work surface at the desired location; whereby
    rotation of the second offset member relative to the first offset member about the offset axis alters an angle between the first and second offset planes and thus an angle of the work surface with respect to horizontal.

2. An adjustable table system as recited in claim 1, in which the support assembly comprises:
    a steering wheel of a vehicle;
    a first table member operatively connected to the first offset member; and
    a mounting assembly for operatively connecting the first table member to the steering wheel.

3. An adjustable table system as recited in claim 2, in which the mounting assembly comprises a plurality of mounting blocks that extend from the first table member to engage the steering wheel such that loads on the first table member are transferred to the steering wheel.

4. An adjustable table system as recited in claim 3, in which at least a portion of at least one of the mounting blocks extends around a portion of the steering wheel.

5. An adjustable table system as recited in claim 1, in which the work surface assembly comprises a second table member that defines a planar surface.

6. An adjustable table system as recited in claim 5, in which at least one groove is formed in the second table member, where the groove defines a hole portion and the thickness of the second table member is reduced at the groove such that the hole portion of the second table member may be removed to form a hole in the second table member.

7. An adjustable table system as recited in claim 1, in which:
    the support assembly comprises
        a steering wheel of a vehicle,
        a first table member operatively connected to the first offset member, and
        a mounting assembly for operatively connecting the first table member to the steering wheel; and
    the work surface assembly comprises a second table member that defines a planar surface.

8. An adjustable table system as recited in claim 1, in which the first and second offset members are identical.

9. An adjustable table system as recited in claim 2, in which:
    the work surface assembly comprises a second table member that defines a planar surface;
    the first and second offset members are identical; and
    the first and second table members are identical.

10. An adjustable table system as recited in claim 1, in which the attachment system comprises:
    an attachment hole formed in the first and second offset members; and
    an axle member that extends at least partly through the attachment hole and engages the first and second offset members to allow the first and second offset members to rotate about the offset axis relative each other but not move along the offset axis relative to each other.

11. An adjustable table system as recited in claim 1, in which
    the support assembly comprises a first table member defining a first mounting groove that engages the first offset member adjacent to the first offset edge to operatively connect the first table member to the first offset member, and
    the support assembly comprises a second table member defining a second mounting groove that engages the second offset member adjacent to the second offset edge to operatively connect the second table member to the second offset member.

12. A method of adjusting an angle of a work surface relative to a reference plane, comprising the steps of:

providing first and second offset members respectively comprising first and second offset edges, first and second engaging surfaces, and a first spacing wall extending between the first offset edge and the first engaging surface;

fixing the reference plane relative to the first offset edge of the first offset member;

fixing the work surface relative to the second offset edge of the second offset member;

attaching the first and second offset members together such that the first engaging surface is in contact with the second engaging surface and the first and second offset members can rotate relative to each other about an offset axis but cannot otherwise move relative to each other, where the first and second spacing walls are sized and dimensioned to create first and second offset angles between the first offset plane and the first reference plane; and rotating the second offset member relative to the first offset member to adjust the angle.

13. An adjustable table system comprising:

a first offset member comprising a first offset edge defining a first offset plane, a first engaging surface defining a first reference plane, a first attachment hole formed in the first engaging surface, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, a second attachment hole formed in the second engaging surface, and a second spacing wall extending between the second offset edge and the second engaging surface, where the second spacing wall is sized and dimensioned to create a second offset angle between the second offset plane and the second reference plane;

an axle member that extends through the first and second attachment holes to attach the first and second offset members together such that the first engaging surface is in contact with the second engaging surface and the offset members are rotatable relative to each other about an offset axis;

a first table member operatively connected to the first offset edge of the first offset member for supporting the first offset member at a desired location;

a second table member for engaging the second offset edge of the second offset member to form a work surface at the desired location; whereby rotation of the second offset member relative to the first offset member about the offset axis alters an angle between the first and second offset planes and thus an angle of the work surface with respect to horizontal.

14. An adjustable table system as recited in claim 13, further comprising a plurality of mounting blocks that extend from the first table member to engage a steering wheel such that loads on the first table member are transferred to the steering wheel.

15. An adjustable table system as recited in claim 14, in which at least a portion of at least one of the mounting blocks extends around a portion of the steering wheel.

16. An adjustable table system as recited in claim 13, in which:

the first and second offset members are identical; and the first and second table members are identical.

17. An adjustable table system comprising:

a first offset member comprising a first offset edge defining a first offset plane, a first engaging surface defining a first reference plane, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, and a second spacing wall extending between the second offset edge and the second engaging surface, where the second spacing wall is sized and dimensioned to create a second offset angle between the second offset plane and the second reference plane;

an attachment system for attaching the first and second offset members together such that the offset members are rotatable relative to each other about an offset axis;

a support assembly for engaging the first offset member and supporting the first offset member at a desired location, the support assembly comprising a steering wheel of a vehicle, a first table member operatively connected to the first offset member, and a mounting assembly for operatively connecting the first table member to the steering wheel;

a work surface assembly for engaging the second offset edge to form a work surface at the desired location; whereby rotation of the second offset member relative to the first offset member about the offset axis alters an angle between the first and second offset planes and thus an angle of the work surface with respect to horizontal.

18. An adjustable table system as recited in claim 17, in which the mounting assembly comprises a plurality of mounting blocks that extend from the first table member to engage the steering wheel such that loads on the first table member are transferred to the steering wheel.

19. An adjustable table system as recited in claim 18, in which at least a portion of at least one of the mounting blocks extends around a portion of the steering wheel.

20. An adjustable table system comprising:

a first offset member comprising a first offset edge defining a first offset plane, a first engaging surface defining a first reference plane, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, and a second spacing wall extending between the second offset edge and the second engaging surface, where the second spacing wall is sized and dimensioned to create a second offset angle between the second offset plane and the second reference plane:

an attachment system for attaching the first and second offset members together such that the offset members are rotatable relative to each other about an offset axis;

a support assembly for engaging the first offset member and supporting the first offset member at a desired location, wherein the support assembly comprises a steering wheel of a vehicle, a first table member operatively connected to the first offset member, and a mounting assembly for operatively connecting the first table member to the steering wheel;

a work surface assembly for engaging the second offset edge to form a work surface at the desired location: whereby rotation of the second offset member relative to the first offset member about the offset axis alters an angle between the first and second offset planes and thus an angle of the work surface with respect to horizontal.

21. An adjustable table system comprising:

a first offset member comprising a first offset edge defining a first offset plane, a first engaging surface defining a first reference plane, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, and a second spacing wall extending between the second offset edge and the second engaging surface, where the second spacing wall is sized and dimensioned to create a second offset angle between the second offset plane and the second reference plane:

an attachment system for attaching the first and second offset members together such that the offset members are rotatable relative to each other about an offset axis;

a support assembly for engaging the first offset member and supporting the first offset member at a desired location, a first work table member operatively connected to the first offset member;

a work surface assembly for engaging the second offset edge to form a work surface at the desired location wherein the work surface comprises a second table member; whereby rotation of the second offset member relative to the first offset member about the offset axis alters an angle between the first and second offset planes and thus an angle of the work surface with respect to horizontal; and the first and second offset members are identical.

22. An adjustable table system as recited in claim 21, in which the first and second table members are identical.

23. An adjustable table system comprising:

a first offset member comprising a first offset edge defining a first offset plane, a first engaging surface defining a first reference plane, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, and a second spacing wall extending between the second offset edge and the second engaging surface, where the second spacing wall is sized and dimensioned to create a second offset angle between the second offset plane and the second reference plane;

an attachment system for attaching the first and second offset members together such that the offset members are rotatable relative to each other about an offset axis;

a support assembly for engaging the first offset member and supporting the first offset member at a desired location, where the support assembly comprises a first table member defining a first mounting groove that engages the first offset member adjacent to the first offset edge to operatively connect the first table member to the first offset member, and a second table member defining a second mounting groove that engages the second offset member adjacent to the second offset edge to operatively connect the second table member to the second offset member;

a work surface assembly for engaging the second offset edge to form a work surface at the desired location; whereby rotation of the second offset member relative to the first offset member about the offset axis alters an angle between the first and second offset planes and thus an angle of the work surface with respect to horizontal.

24. An adjustable table system comprising:

a first offset member comprising a first offset edge defining a first offset plane, a first engaging surface defining a first reference plane, a first attachment hole formed in the first engaging surface, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, a second attachment hole formed in the second engaging surface, and a second spacing wall extending between the second offset edge and the second engaging surface, where the second spacing wall is sized and dimensioned to create a second offset angle between the second offset plane and the second reference plane;

an axle member that extends through the first and second attachment holes to attach the first and second offset members together such that the offset members are rotatable relative to each other about an offset axis;

a first table member operatively connected to the first offset edge of the first offset member for supporting the first offset member at a desired location;

a second table member for engaging the second offset edge of the second offset member to form a work surface at the desired location; whereby rotation of the second offset member relative to the first offset member about the offset axis alters an angle between the first and second offset planes and thus an angle of the work surface with respect to horizontal;

the first and second offset members are identical; and the first and second table members are identical.

25. An adjustable table system comprising:

a first offset member comprising a first offset edge defining a first offset plane, a first engaging surface defining a first reference plane, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, and a second spacing wall extending between the second offset edge and the second engaging surface, where the second spacing wall is sized and dimensioned to create a second offset angle between the second offset plane and the second reference plane;

an attachment system for attaching the first and second offset members together such that the offset members are rotatable relative to each other about an offset axis;

a support assembly for engaging the first offset member and supporting the first offset member at a desired location;

a work surface assembly for engaging the second offset edge to form a work surface at the desired location, where the work surface assembly comprises
a second table member that defines a planar surface,
at least one groove is formed in the second table member, where the groove defines a hole portion and the thickness of the second table member is reduced at the groove such that the hole portion of the second table member may be removed to form a hole in the second table member; whereby
rotation of the second offset member relative to the first offset member about the offset axis alters an angle between the first and second offset planes and thus an angle of the work surface with respect to horizontal.

26. An adjustable table system comprising:

a first offset member comprising a first offset edge defining a first offset plane, a first engaging surface defining a first reference plane, a first attachment hole formed in the first engaging surface, and a first spacing wall extending between the first offset edge and the first engaging surface, where the first spacing wall is sized and dimensioned to create a first offset angle between the first offset plane and the first reference plane;

a second offset member comprising a second offset edge defining a second offset plane, a second engaging surface defining a second reference plane, a second attachment hole formed in the second engaging surface, and a second spacing wall extending between the second offset edge and the second engaging surface, where the second spacing wall is sized and dimensioned to create a second offset angle between the second offset plane and the second reference plane;

an axle member that extends through the first and second attachment holes to attach the first and second offset members together such that the offset members are rotatable relative to each other about an offset axis;

a first table member operatively connected to the first offset edge of the first offset member for supporting the first offset member at a desired location;

a second table member for engaging the second offset edge of the second offset member to form a work surface at the desired location; and a plurality of mounting blocks that extend from the first table member to engage a steering wheel such that loads on the first table member are transferred to the steering wheel; whereby
rotation of the second offset member relative to the first offset member about the offset axis alters an angle between the first and second offset planes and thus an angle of the work surface with respect to horizontal.

27. An adjustable table system as recited in claim 26, in which at least a portion of at least one of the mounting blocks extends around a portion of the steering wheel.

* * * * *